United States Patent
Marsland

(10) Patent No.: US 6,289,448 B1
(45) Date of Patent: Sep. 11, 2001

(54) METHOD, APPARATUS AND COMPUTER PROGRAM PRODUCT FOR DEBUGGING A COMPUTER'S BOOT PROCESS

(75) Inventor: Tim P. Marsland, Half Moon Bay, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/105,588

(22) Filed: Jun. 26, 1998

(51) Int. Cl.$^7$ .................................. G06F 15/177
(52) U.S. Cl. ........................................... 713/2
(58) Field of Search .................. 712/1–3, 222–220; 364/140.09; 395/568, 652; 713/1–2

(56) References Cited

U.S. PATENT DOCUMENTS

| | | | |
|---|---|---|---|
| 5,598,531 | * 1/1997 | Hill | 713/200 |
| 5,850,562 | * 12/1998 | Crump | 395/800 |
| 5,935,266 | * 8/1999 | Thurnhofer | 714/726 |
| 5,958,049 | * 9/1999 | Mealey et al. | 713/1 |
| 5,961,641 | * 10/1999 | Hasegawa | 713/1 |
| 6,006,328 | * 12/1999 | Drake | 713/200 |

OTHER PUBLICATIONS

IEEE Computer Society, *IEEE Standard For Boot (Initialization Configuration) Firmware: Core Requirements and Practices*, Institute of Electrical and Electronics Engineers, Inc., 343 East 47th Street, New York, NY, 10017 (1994).

* cited by examiner

Primary Examiner—William Grant
Assistant Examiner—Ronald D Hartman, Jr.
(74) Attorney, Agent, or Firm—Beyer,Weaver&Thomas LLP

(57) ABSTRACT

Apparatus, methods, and computer program products are disclosed for temporarily including bootstrap debugging code for use with a client program. The invention improves a user's ability to debug the computer boot process by providing an efficient mechanism for interposing additional or replacement functionality between the client program and bootstrap services. A bootstrap service invocation made by the client program is intercepted and the computer performs the interposed functionality before providing the invoked service.

47 Claims, 9 Drawing Sheets

METHOD, APPARATUS AND COMPUTER PROGRAM PRODUCT FOR DEBUGGING A COMPUTER'S BOOT PROCESS

BACKGROUND OF THE INVENTION

1. Field of the Invention

This invention relates to the field of booting computer systems. Specifically, this invention is a method, apparatus, and computer program product for debugging the operation of the boot process used to start execution of a client program (such as an operating system) within a computer.

2. Background

Most operating systems need to first be loaded into volatile memory prior to execution.

A typical computer operating system manages computer resources and provides services. For example, the operating system provides controlled access to the computer's resources (such as memory and devices). Usually, a firmware bootstrap program, stored in read-only-memory (ROM), controls a computer between the time the computer is turned on and the time the client program (such as an operating system or a secondary bootstrap program) takes control of the computer. The firmware bootstrap program is responsible for testing and initializing the computer hardware, determining the computer's configuration and devices, invoking the operating system and providing debugging facilities in case of failure.

A bootstrap process often causes a firmware program to execute to load a primary bootstrap program from a known (and reserved) location in storage (either local disk or network storage) into the computer's memory. The computer then starts execution of this primary bootstrap program. The primary bootstrap program is a very small stand-alone FCode or machine language program (for example, the primary bootstrap program on a Sun Microsystems, Inc., computer is limited to 8K bytes). Thus, its functionality is very limited. Generally, the primary bootstrap program has limited capability to use the computer's devices through FCode drivers (subsequently described in the Detailed Description) supplied with the device and to locate and load a secondary bootstrap program accessible from the boot device. The primary bootstrap program includes services that understand the file structure of the boot device. The primary bootstrap program then locates and loads a specified file from the boot device. This specified file may be a stand-alone program such as a diagnostic, an operating system, or a secondary bootstrap program. These stand-alone programs are client programs of their respective bootstrap programs.

The interaction between the client program, the FCode services, and the operating system services is complex and occurs while few system services are available to simplify debugging of the booting process. This situation is particularly true because a mixture of machine instructions and FCode instructions are being executed during the boot phase. This problem is exacerbated by the fact that the mix between FCode and machine instruction execution changes during the boot process.

Thus, the problem is that debugging the bootstrap process is difficult because of the complexity of the bootstrap process, the intermixing of execution modes, and the scarcity of debugging tools during the boot process.

One prior art approach to this problem is including debugging or tracing code within the secondary bootstrap program. However, this capability is not required in production code and if included increases the complexity of the secondary bootstrap program.

It would be advantageous to temporarily provide additional capability to the secondary bootstrap program for debugging and development purposes.

SUMMARY OF THE INVENTION

The present invention provides a mechanism for temporarily including bootstrap debugging code for use with a client program. The invention improves a user's ability to debug the computer boot process by providing an efficient mechanism for interposing additional or replacement functionality between the client program and the bootstrap services. A bootstrap service invocation made by the client program is intercepted and the computer performs the interposed functionality before providing the invoked service.

One aspect of the invention is a computer controlled method for debugging a boot process executing on a computer. The method executes a bootstrap program on the computer. The bootstrap program provides one or more services. The bootstrap program also initiates a bootstrap debug program. The bootstrap debug program intercepts a service invocation of the one or more services. The bootstrap debug program also captures service information that is related to the service invocation of the one or more services and performs the service invocation of the one or more services.

Another aspect of the invention is an apparatus, having a central processing unit (CPU) and a memory coupled to the CPU, for debugging a boot process executed by the apparatus. The apparatus includes a boot mechanism that is configured to execute, using said CPU and said memory, a bootstrap program providing one or more services. The bootstrap program uses a debug initiation mechanism that is configured to initiate a bootstrap debug program. The bootstrap debug program uses a service interception mechanism that is configured to intercept a service invocation of the one or more services. The apparatus also includes an information acquisition mechanism that is configured to capture service information related to the service invocation of the one or more services. In addition, the apparatus includes a service invocation mechanism that is configured to perform the service invocation of the one or more services.

Yet a further aspect of the invention, is a computer program product embedded on a computer usable medium for causing a computer to debug a boot process executed by the computer. When executed on a computer, the computer readable code causes a computer to effect a boot mechanism, a debug initiation mechanism, a service interception mechanism, an information acquisition mechanism, and a service invocation mechanism. Each of these mechanisms having the same functions as the corresponding mechanisms for the previously described apparatus.

An additional aspect of the invention is computer program product embodied in a carrier wave. The carrier wave transmits computer readable code therein for causing a computer to debug a boot process executed by the computer. When executed on a computer, the computer readable code causes a computer to effect a boot mechanism, a debug initiation mechanism, a service interception mechanism, an information acquisition mechanism, and a service invocation mechanism. Each of these mechanisms having the same functions as the corresponding mechanisms for the previously described apparatus.

The foregoing and many other aspects of the present invention will no doubt become obvious to those of ordinary skill in the art after having read the following detailed description of the preferred embodiments that are illustrated in the various drawing figures.

DESCRIPTION OF THE PREFERRED EMBODIMENTS

This document incorporates by reference the "definition of terms" (section 2.3) of IEEE except where such terms are superceded by subsequently directly or indirectly defined terms.

Detailed Description

Figure 1:
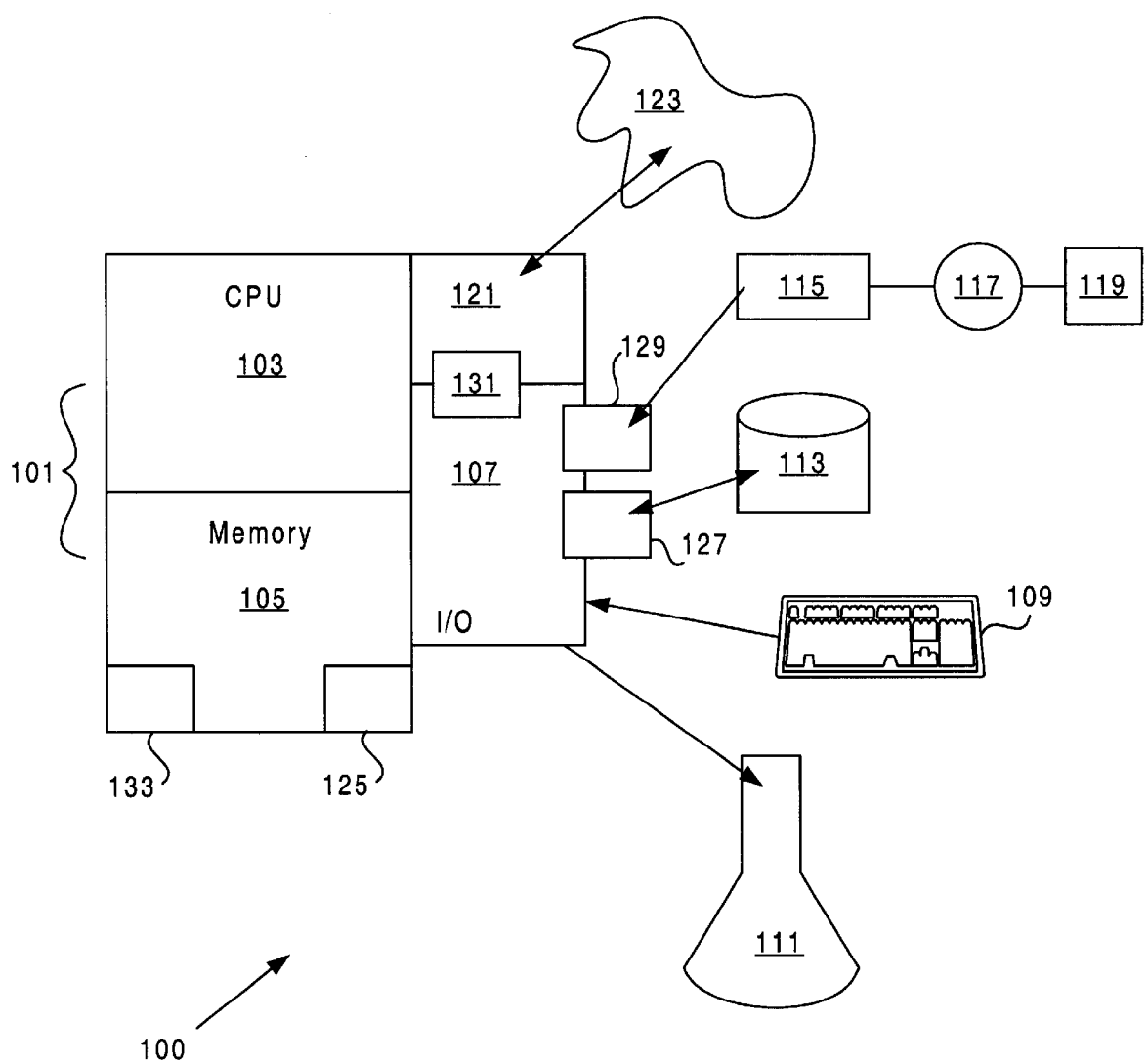
FIG. 1 illustrates a computer system capable of executing computer readable program code, thus embodying the invention in accordance with a preferred embodiment.

The invention uses a computer. Some of the elements of a computer, as indicated by general reference character 100, configured to support the invention are shown in FIG. 1 wherein a processor 101 is shown, having a central processor unit (CPU) 103, a memory section 105 and an input/output (I/O) section 107. The I/O section 107 is connected to a keyboard 109, a display unit 111, a disk storage unit 113 and a CD-ROM drive unit 115. The CD-ROM drive unit 115 can read a CD-ROM medium 117 that typically contains a program and data 119. The computer 100 also includes a network interface 121 that is used to access a network 123. In addition, the computer 100 includes a FCode interpreter ROM 125 that includes computer instructions that enable the computer 100 to interpret FCode programs. The FCode interpreter ROM 125 also includes a FCode program to determine the configuration of the computer 100 and to load a primary bootstrap program from a designated primary boot device using that device's FCode device driver program. Such a FCode device driver program resides in a FCode disk device driver ROM 127. The FCode disk device driver ROM 127 contains a FCode device driver that can be used by the CPU 103 to access data on the disk storage unit 113. The CD-ROM drive unit 115 includes a FCode CD device driver ROM 129 that contains a FCode device driver that can be used by the CPU 103 to access data accessible using the CD-ROM drive unit 115. The network interface 121 contains a FCode network device driver ROM 131 that contains a FCode device driver that can be used by the CPU 103 to access the network 123. In addition, the memory section 105 includes storage for a program storage memory region 133 that contains a portion of a program that causes the computer to perform the inventive process.

The CD-ROM drive unit 115, along with the CD-ROM medium 117, the disk storage unit 113, and the network 123 comprise a file storage mechanism. Such a computer system is capable of executing applications that embody the invention. One skilled in the art will understand that the computer system illustrated in FIG. 1 includes devices that may not be needed for each embodiment of the invention.

When the computer 100 is initially powered up, programs in the FCode interpreter ROM 125 are invoked to determine the computer's configuration and to load the primary bootstrap from the primary bootstrap device.

Figure 2:
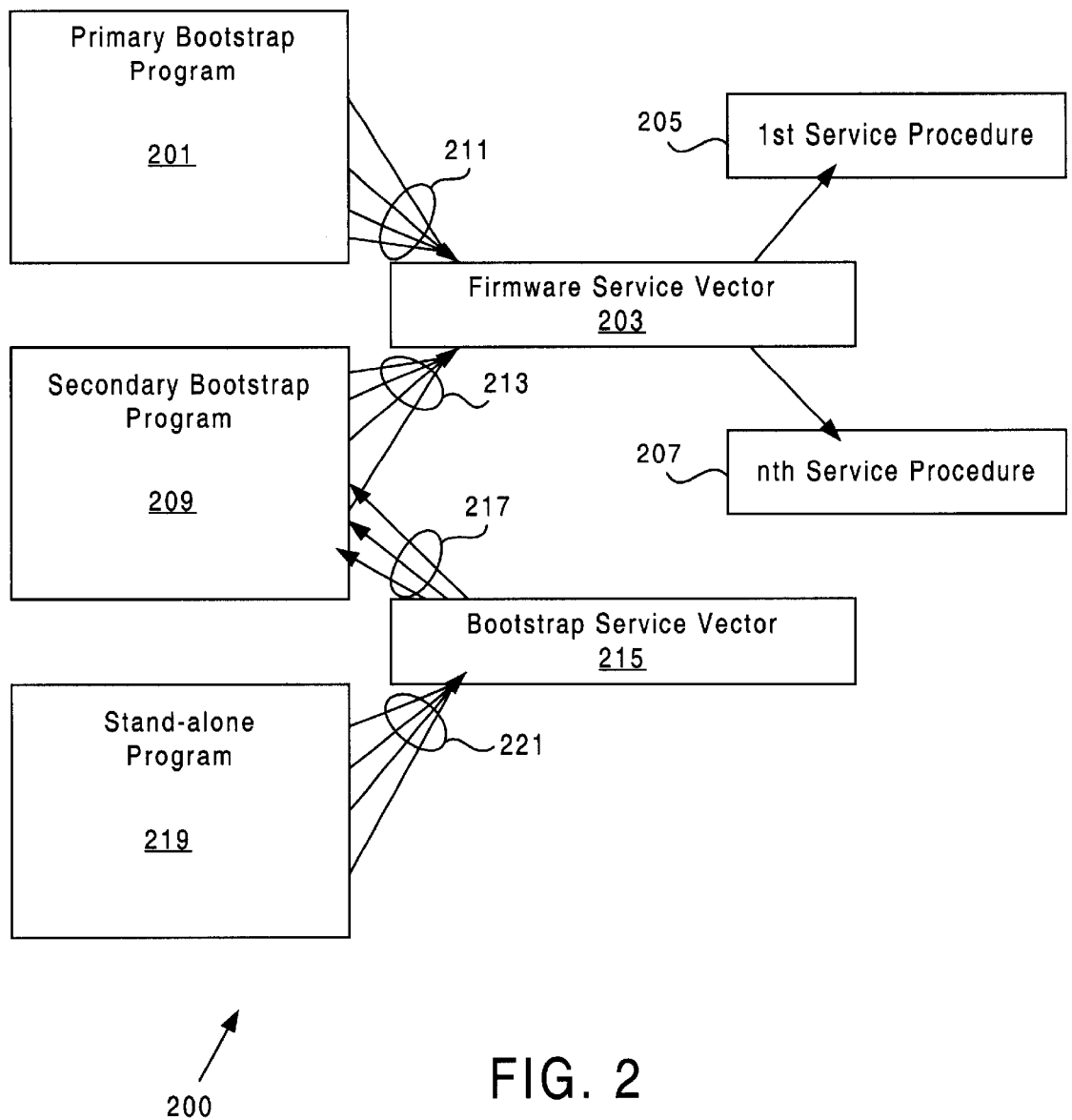
FIG. 2 illustrates a prior-art boot service dispatch mechanism.

FIG. 2 illustrates a prior art boot service dispatch mechanism, indicated by general reference character 200, used to dispatch service requests for boot time services. A primary bootstrap program 201 obtains a boot-time service by invoking the service through a firmware operation vector 203. The firmware operation vector 203 is used to dispatch a service invocation to the appropriate service routine such as a first service procedure 205 or an nth service procedure 207. One of the one or more service procedures 205, 207 may be configured to invoke other procedures based on arguments provided during the service invocation. These service procedures may comprise FCode or machine instructions. In addition to the primary bootstrap program 201, a secondary bootstrap program 209, that is loaded and invoked from the primary bootstrap program 201, may also use the firmware operation vector 203 to obtain boot-time services. The primary bootstrap program 201 invokes services through the firmware operation vector 203 as indicated by a service invocation 211. The secondary bootstrap program 209 invokes services through the firmware operation vector 203 as indicated by a service invocation 213. The secondary bootstrap program 209 creates a bootstrap service vector 215 that is used by the secondary bootstrap program's client program to invoke procedures within the secondary bootstrap program 209 as indicated by a service dispatch 217. The bootstrap service vector 215 is activated when its address is passed to a stand-alone program 219 that uses the bootstrap service vector 215 to invoke the services provided by the secondary bootstrap program 209 (that may use the services of the one or more service procedures 205, 207) as indicated by a service invocation 221. The stand-alone program 219 is the client program for the secondary bootstrap program 209 and is often an operating system program, a diagnostic program or other independent program. The bootstrap service vector 215 may contain pointers to procedures in the secondary bootstrap program 209 for services indexed through the bootstrap service vector 215. The bootstrap service vector 215 may also contain a pointer to a service dispatch procedure in the secondary bootstrap program 209 that dispatches the invocation to a service procedure dependent on an argument (such as a service name string) provided with the service invocation. This latter mechanism enables the addition of new named services without the need to explicitly resolve links.

Often, the bootstrap program is written in a computer independent interpreted language such as the FCode programming language (defined by *IEEE Standard for Boot (Initialization Configuration) Firmware: Core Requirements and Practices*, IEEE std 1275–1994, © 1994 Institute of Electrical and Electronic Engineers, Inc., ISBN 1-55937-426-8 and incorporated herein by reference in its entirety (hereinafter referred to as IEEE). Use of a computer independent language for the bootstrap program allows devices to include their own device drivers (a "plug-in drive") that are independent of the computer or the computer's operating system. These device drivers may also provide information about the device such that the bootstrap program can automatically configure the computer's devices. Such devices include memory allocation drivers. More information about booting is provided in Annex F of IEEE.

The firmware bootstrap program can access the device driver firmware stored with the device to perform operations on the device. For efficiency reasons, these firmware device drivers are generally not used when the final operating system program is executing. Instead, the operating system uses device drivers that provide complete functionality, that have been compiled to the computer's native instruction set and optimized for performance.

Some computers use the firmware bootstrap program to directly load the computer's operating system, diagnostic program or other stand-alone program. Other computers use the firmware bootstrap program to load a primary bootstrap program from a well-known location on a specified device. The loaded primary bootstrap program then loads and executes the client program (such as an operating system or a more complex bootstrap program). The primary bootstrap program may use the firmware device drivers until the client program is stable.

The secondary bootstrap program includes capabilities used to boot the operating system's kernel and initialize other operating system services. Generally, the secondary bootstrap program contains procedures that access a limited number of boot time services. The secondary bootstrap program loads the relevant portions of the operating system into the computer, and stages and directs the steps used in the booting process. The secondary bootstrap program generally includes complete file system and memory allocation capability. The secondary bootstrap program may also determine or verify the computer system's configuration (including such things as the number of CPUs, accessible devices, size of cache and other configuration information as is understood by one skilled in the art).

The secondary bootstrap program uses the firmware device drivers until the operating system (or other client program) is sufficiently operational to provide those services. Thus, the secondary bootstrap program uses FCode boot services and operating system services to boot the computer. This interaction between the FCode services and the operating system services is controlled through the use of client callback services.

Figure 3A:
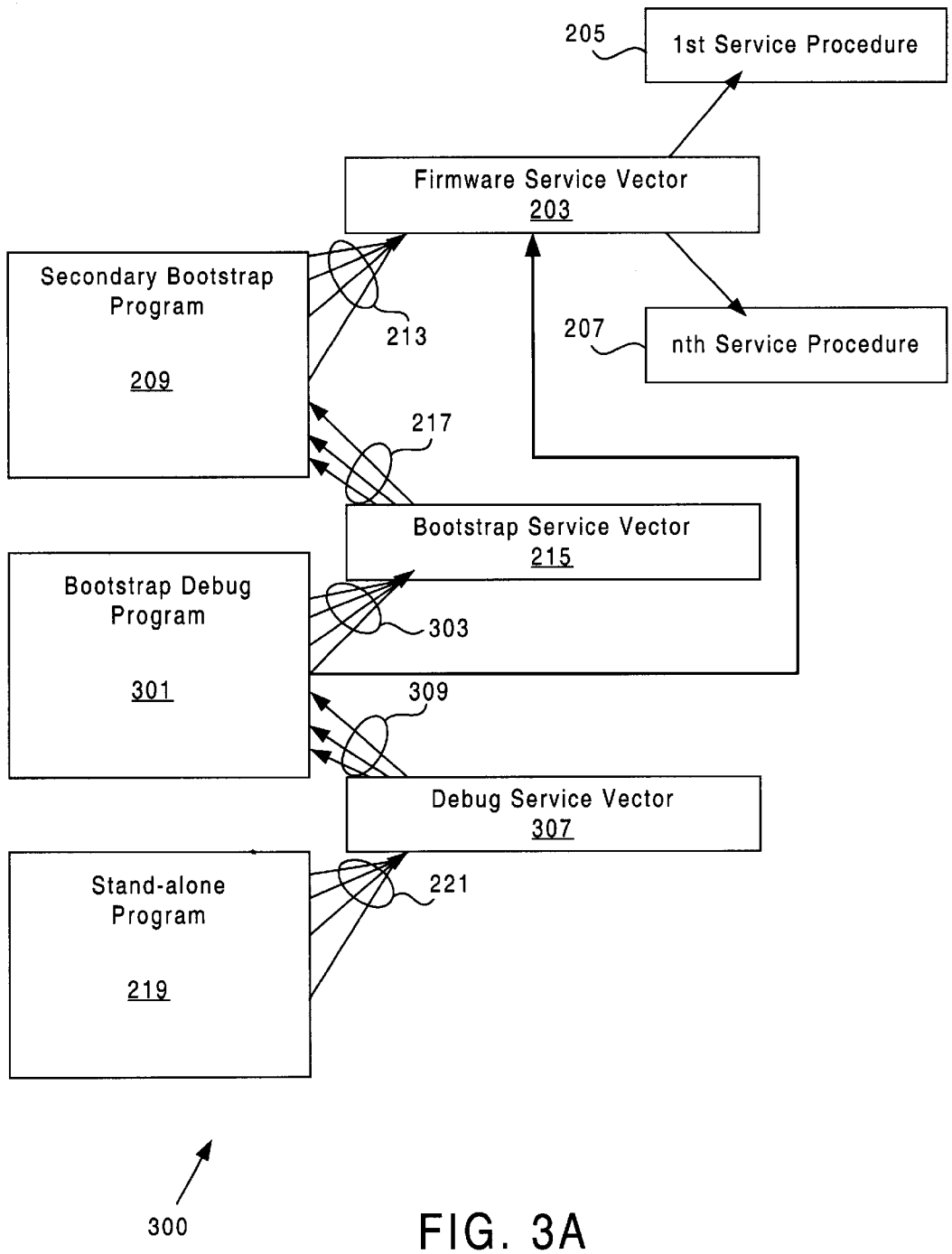
FIG. 3A illustrates a boot service dispatch mechanism in accordance with a preferred embodiment.

FIG. 3A illustrates a boot service dispatch mechanism, indicated by general reference character 300, that captures service invocations. Here a bootstrap debug program 301 is loaded by the secondary bootstrap program 209 instead of the stand-alone program 219. When required, the bootstrap debug program 301 accesses services provided by the secondary bootstrap program 209 through the bootstrap service vector 215 as indicated by a service invocation 303. In addition, the bootstrap debug program 301 can directly access the one or more service procedures 205, 207 through the firmware operation vector 203 as indicated by a service invocation 305. The bootstrap debug program 301 may also contain replacement code corresponding to the one or more service procedures 205, 207 or services provided by the secondary bootstrap program 209 such that the bootstrap debug program 301 could replace some or all of the functionality provided by the secondary bootstrap program 209 and the one or more service procedures 205,207. The bootstrap debug program 301 may also contain debugging procedures that gather and save information about requested services. One skilled in the art will understand that the "bootstrap debug program" terminology does not limit the functionality provided by the bootstrap debug program 301.

The "bootstrap debug program" term includes, without limitation, a subsequent bootstrap program, an operating system program, a utility program, a debugging program, a tracing program, a filesystem extension program, a network protocol stack program, and a diagnostic program.

The bootstrap debug program 301 loads and invokes its client program (the stand-alone program 219). The bootstrap debug program 301 activates a debug service vector 307 by passing it to the stand-alone program 219. Thus, the stand-alone program 219 will use the debug service vector 307 instead of the bootstrap service vector 215 to invoke services as indicated by the service invocation 221. The debug service vector 307 passes the service invocation to the bootstrap debug program 301 (as indicated by a service dispatch 309) where the request is processed. The bootstrap debug program 301 captures service information about the service request, saves this information for later presentation to the user, and then performs the requested service by invoking the requested service using the bootstrap service vector 215 or the firmware operation vector 203. One skilled in the art will understand that other approaches exist in the art for providing the previously discussed vectors.

As is subsequently described, the bootstrap debug program 301 generally gathers information about the service invoked by the debug program's client program (such as the stand-alone program 219). This information can be saved for later presentation to the user, used to trigger on-line debugging functions, or used by custom procedures within the bootstrap debug program 301 to modify the invocation. One preferred embodiment maintains a trace of which services were invoked by the stand-alone program 219. Another preferred embodiment provides interactive debugging capabilities that are triggered when a service is invoked by the client program. Another preferred embodiment provides replacement code that, when executed, provides new or modified services normally provided by the bootstrap's parent program. Debug programs can be cascaded to allow the user to select specific combinations of debugging features.

Figure 3B:
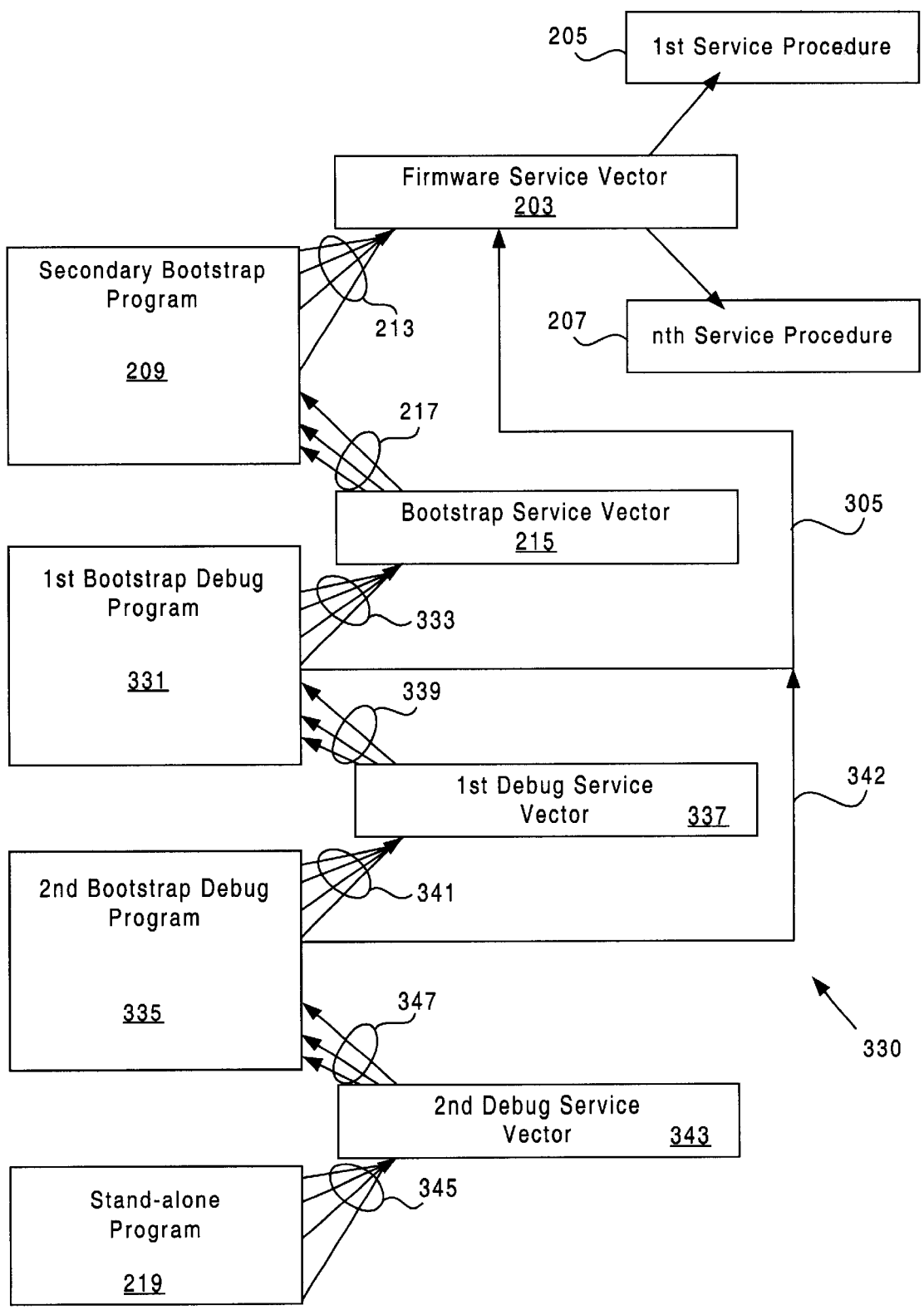
FIG. 3B illustrates a cascaded boot service dispatch mechanism in accordance with a preferred embodiment.

FIG. 3B illustrates a cascaded boot service dispatch mechanism, indicated by general reference character 330, that captures specific service invocations. Here a first bootstrap debug program 331 is loaded by the secondary bootstrap program 209. The first bootstrap debug program 331 accesses services provided by the secondary bootstrap program 209 through the bootstrap service vector 215 as indicated by a service invocation 333. In addition, the first bootstrap debug program 331 can directly access the one or more service procedures 205, 207 through the firmware operation vector 203 as indicated by a service invocation 305. The first bootstrap debug program 331 may also contain replacement code corresponding to the one or more service procedures 205, 207 or the secondary bootstrap program 209 such that the first bootstrap debug program 331 could replace some or all of the functionality provided by the secondary bootstrap program 209 and the one or more service procedures 205, 207. The first bootstrap debug program 331 may also contain debugging procedures that gather and save information about requested services.

The first bootstrap debug program 331 loads a second bootstrap debug program 335 as its client program passing a first debug operation vector 337. The first debug operation vector 337 passes service invocations to the first bootstrap debug program 331 as indicated by a service dispatch 339. The second bootstrap debug program 335 invokes services through the first debug operation vector 337 as indicated by a service invocation 341. The second bootstrap debug program 335 then loads its client program, the stand-alone program 219, activating a second debug operation vector 343 by passing it to the stand-alone program 219 for service invocations. These service invocations are indicated by a service invocation 345. These service invocations are passed to the second bootstrap debug program 335 as indicated by a service dispatch 347. In addition, the second bootstrap debug program 335 can directly access the one or more service procedures 205, 207 through the firmware operation vector 203 as indicated by a service dispatch 342.

The cascaded boot service dispatch mechanism 330 allows a user to include combinations of debugging programs that are targeted to specific problems that interest the user. Thus, the first bootstrap debug program 331 could be configured to capture information about a first service and the second bootstrap debug program 335 could be configured to capture information about a second service. The cascaded boot service dispatch mechanism 330 also allows a user to write a particular targeted debugging program that operates in addition to a more general debugging program such as a service trace program. In addition, new or modified boot services can be easily inserted, tested and removed. Once tested, the new or modified boot service can be included in the secondary bootstrap program 209 using traditional methods.

Figure 4A:
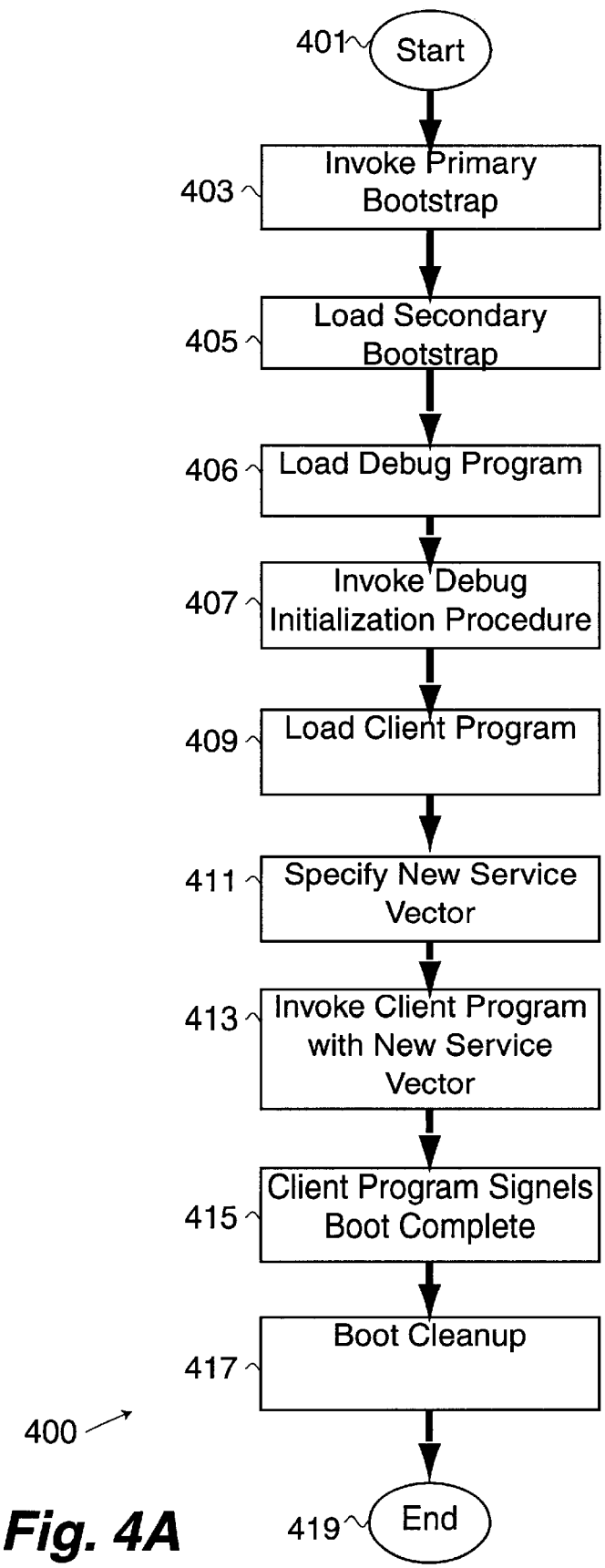
FIG. 4A illustrates a debug enabled boot process in accordance with a preferred embodiment.

FIG. 4A illustrates a debug enabled boot process, indicated by general reference character 400, used to perform debugging operations on the bootstrap loading process. The debug enabled boot process 400 initiates at a 'start' terminal 401 and continues to an 'invoke primary bootstrap' procedure 403. The 'invoke primary bootstrap' procedure 403 is performed when the computer is powered up or in response to a start or restart command. This causes execution of code in the FCode interpreter ROM 125 that locates, loads and executes the primary bootstrap program from a well-known location on the boot device. The primary bootstrap program then loads the secondary bootstrap program at a 'load secondary bootstrap' procedure 405. Next, the secondary bootstrap program loads a debug program (as its client program) at a 'load bootstrap debug program' procedure 406. The secondary bootstrap program invokes the debug program's initialization procedure at an 'invoke bootstrap debug program initialization' procedure 407. The debug program's initialization procedure allocates a new service vector (or in some embodiments, may copy the contents of the original operation vector used by the primary bootstrap program to a re-vector vector and then replace the original operation vector with a second operation vector at the same location).

Once the new service vector is created, the debug program loads its client program into memory at a 'load client program' procedure 409. The client program includes (without limitation) a subsequent bootstrap program, an operating system program, a utility program, a debugging program, a tracing program, a filesystem extension program, a network protocol stack program, and a diagnostic program. Next, a 'specify service vector' procedure 411 specifies that the client program is to use the new service vector. A preferred embodiment passes the address of the service vector to the client program as an argument at an 'invoke client program' procedure 413 thus activating the new service vector. The client program then executes. Each service invocation through the provided service vector invokes procedures within the debug program as is subsequently described with respect to FIG. 4B. Eventually, the client program signals that the boot process is complete by invoking a termination service at a 'client signals boot complete' procedure 415. The termination service causes the debug program to perform any cleanup required for its termination at a 'boot program cleanup' procedure 417. The termination service also invokes the corresponding termination service in the secondary bootstrap program The debug enabled boot process 400 then completes through an 'end' terminal 419. The debug procedure also captures callback invocations, as is subsequently described.

Figure 4B:
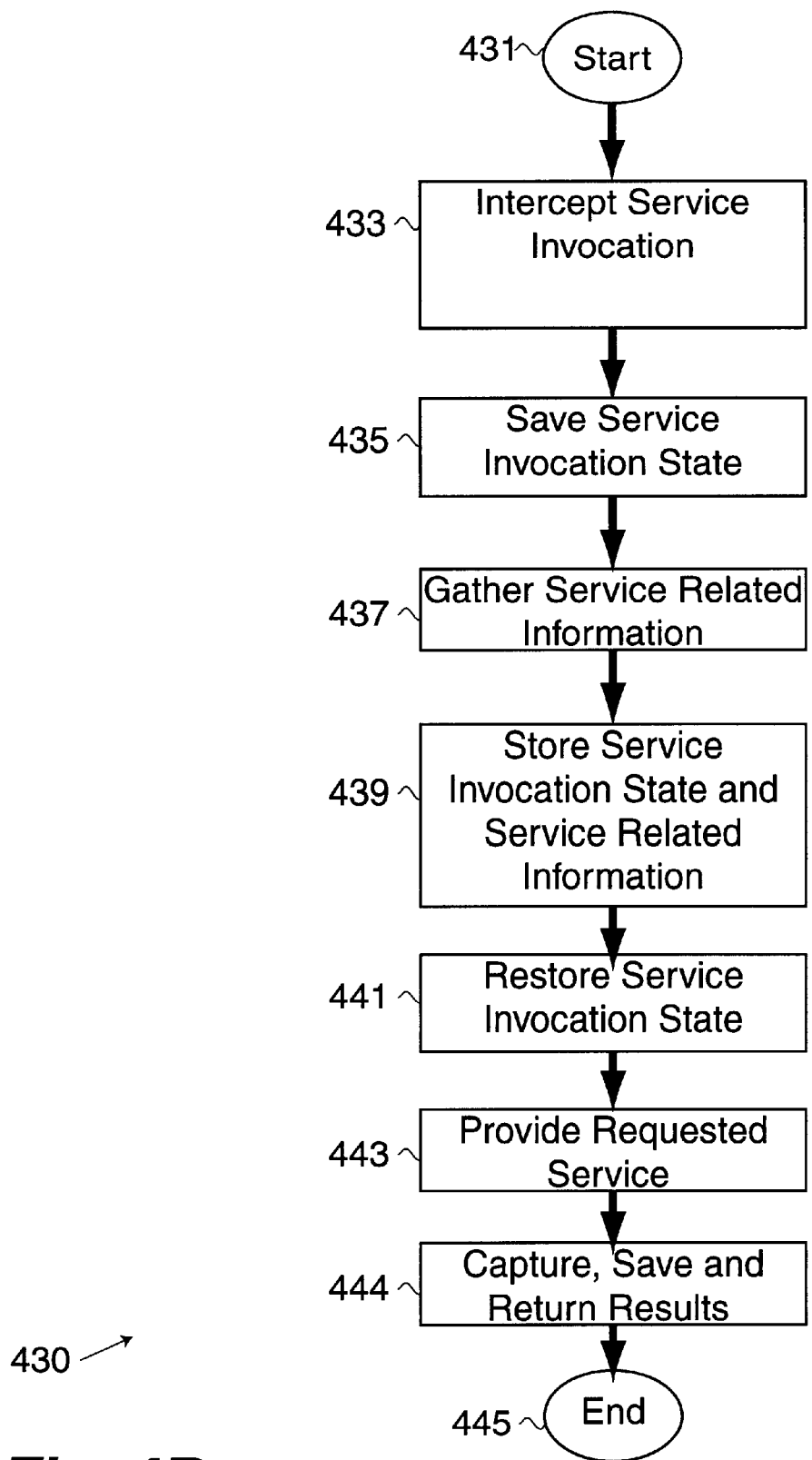
FIG. 4B illustrates an intercept service process in accordance with a preferred embodiment.

FIG. 4B illustrates an intercept service process, indicated by general reference character 430, for intercepting and processing a service request from a client program. The intercept service process 430 initiates at a 'start' terminal 431 and continues to an 'intercept service invocation' procedure 433 that receives a service request via the appropriate operation vector or callback. The intercept service process 430 then saves service invocation information state at a 'save service invocation state' procedure 435 by saving information such as the stack pointer, status conditions, registers, and other information as required. In particular, this information may include (without limitation) a memory address, an invocation parameter, a data value, a time value, and a service identification. This saved service invocation state can be used when providing the requested service.

Next, the intercept service process 430 continues to a 'gather service related information' procedure 437 that gathers machine state information of interest to the author of the debug program and/or as related to the invoked service.

Machine state information is the state of the entire computer system or any portion of the computer system that can be determined by a computer program. Thus, the machine state information includes (without limitation) device state, memory usage, memory mapping state, and CPU state.

The bootstrap debug program is designed and programmed to gather such information as appropriate. The machine state information includes information that can be used to debug the service. Thus, if the operation is a memory allocation or deallocation operation, the bootstrap debug program could obtain the allocation state of the computer's memory. For services that are directly invoked through an address in a service vector, the invoked procedure saves its identification and the supplied arguments. For services invoked using a service dispatch procedure, the name of the requested service (provided as an argument) and the other arguments are saved. A 'store state and information' procedure 439 saves the service invocation information gathered by the 'save service invocation state' procedure 435 and the machine state information gathered by the 'gather service related information' procedure 437. This information can be saved by displaying the information on the console terminal, storing the information in non-volatile RAM, passing the information to the client program via a callback procedure, or by use of other mechanisms known to those skilled in the art. Next, the intercept service process 430 continues to a 'restore service invocation state' procedure 441 that restores the information gathered by the 'save service invocation state' procedure 435 and then provides the service requested by the client program at a 'provide requested service' procedure 443. The debug enabled boot process 400 can provide this service by performing a procedure that implements the service, or by invoking a service through the provided service vector. A 'capture and save result' procedure 444 then captures, saves and returns the result of the requested service and the intercept service process 430 completes through an 'end' terminal 445. Example details of the intercept service process 430 are subsequently provided for callback operations with respect to FIG. 4C and FIG. 4D.

Figure 4C:
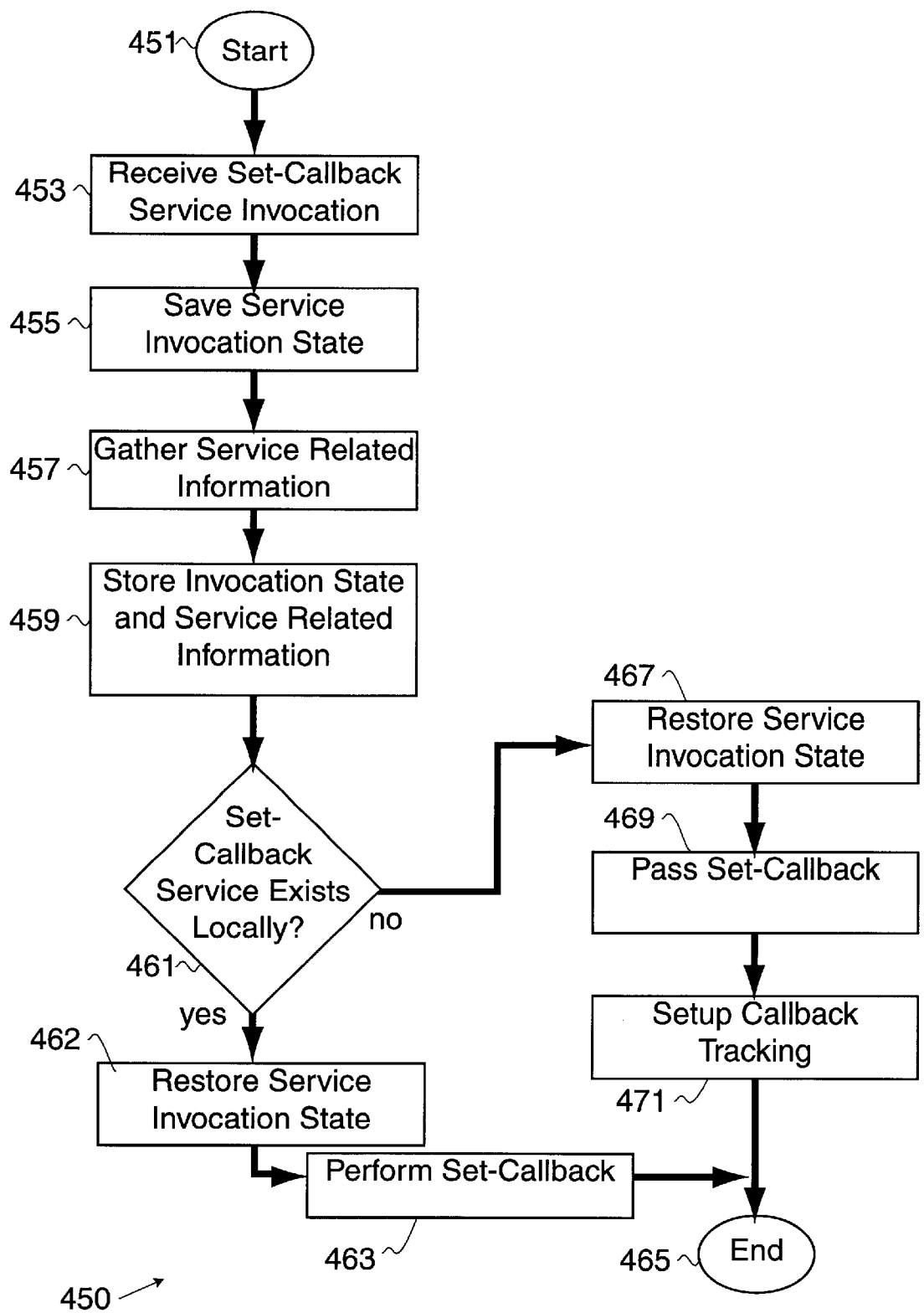
FIG. 4C illustrates an intercept service process used with the set-callback service in accordance with a preferred embodiment.

FIG. 4C illustrates a set-callback service process, indicated by general reference character 450, for intercepting invocations of the set-callback service. The client program may use the set-callback service to specify that the bootstrap program (or the bootstrap debug program) calls a client procedure in response to some condition. The set-callback service process 450 initiates at a 'start' terminal 451 as a result of a set-callback invocation from the client. The set-callback service process 450 continues to a 'receive set-callback invocation' procedure 453 that receives the set-callback service request. Then, a 'save service invocation state' procedure 455 saves the set-callback invocation information. Next, a 'gather service related information' procedure 457 gathers machine state information of interest to the author of the debug program and/or as related to the invoked service. This information and the invocation information are stored by a 'store information' procedure 459. Next, the set-callback service process 450 determines whether the requested callback service exists in this (the local) debug program at a 'local callback service exists' decision procedure 461. If the callback service is locally provided by this debug program, the set-callback service process 450 continues to a 'restore service invocation state' procedure 462 that restores the service invocation state saved by the 'save service invocation state' procedure 455. Then the set-callback service process 450 continues to a 'perform set-callback' procedure 463 that satisfies the set-callback invocation. The set-callback service process 450 then completes through an 'end' terminal 465.

Figure 4D:
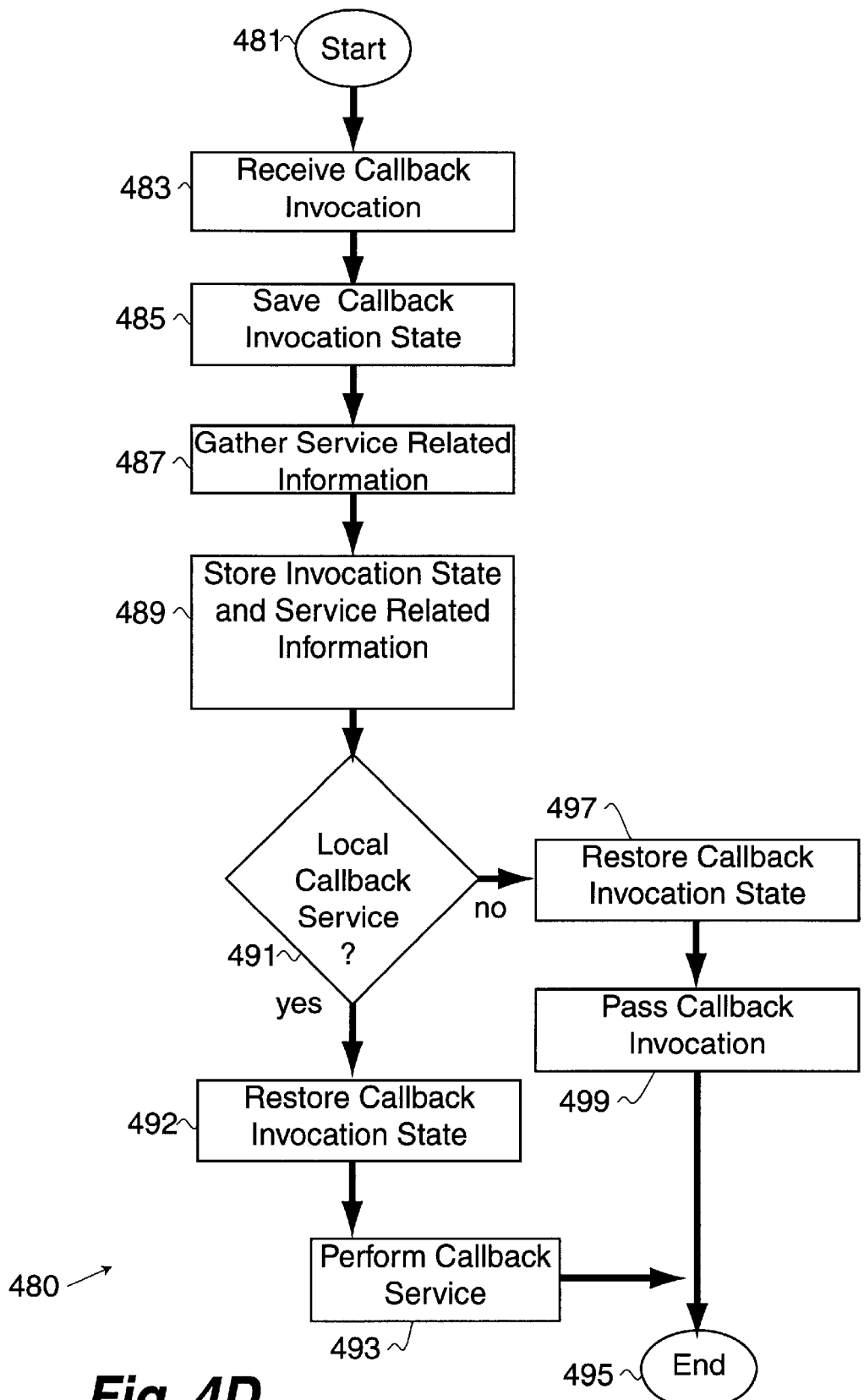
FIG. 4D illustrates an intercept service process used with the callback service in accordance with a preferred embodiment.

However, if the callback service is not local to the instant debug program, as determined at the 'local callback service exists' decision procedure 461, the set-callback service process 450 continues to a 'restore service invocation state' procedure 467. The 'restore service invocation state' procedure 467 restores the invocation state stored by the 'save service invocation state' procedure 455. Then a 'pass set-callback' procedure 469 passes the set-callback invocation to the program that invoked the instant debug program (the parent program) with modified arguments that specify that the callback be returned to the instant debug program instead of the client program. On return from the set-callback service invocation of the instant debug program's parent, the set-callback service process 450 continues to a 'setup callback tracking' procedure 471 that performs any required preparation necessary to receive the callback from the instant debug program's parent. Such preparation may include, without limitation, specifying dispatch tables or programmed-methods for handling the callback invocation from the parent program. The set-callback service process 450 completes through the 'end' terminal 465. Thus, as shown in FIG. 4D, when the parent program invokes the callback, the instant debug program receives the callback, saves information about the callback, and passes the callback to the client program. One skilled in the art will understand that the instant debug program may independently invoke the set-callback service of its parent program as well as passing set-callback service invocations from the client program to the parent program.

FIG. 4D illustrates a callback service intercept process, indicated by general reference character 480, for receiving a callback from a parent program, saving information related to the callback, and passing the callback to the client program. The callback service intercept process 480 initiates at a 'start' terminal 481 when the parent program invokes a callback routine specified by a set-callback service as described in FIG. 4C. A 'receive callback' procedure 483 in the debug program receives the callback from the parent program. The callback service intercept process 480 then saves the invocation state of the callback at a 'save callback invocation state' procedure 485 and gathers service related information at a 'gather service related information' procedure 487. Next, a 'store gathered information' procedure 489 presents the information to the user or stores the information for later retrieval. The callback service intercept process 480 then determines whether the callback invocation is to be serviced by the instant debug program or the client program at a 'local callback service' decision procedure 491. The 'local callback service' decision procedure 491 uses information saved at the 'setup callback tracking' procedure 471 of FIG. 4C to determine whether the callback is serviced by the instant debug program or the client program.

If the callback is to be serviced by the instant debug program, the callback service intercept process 480 continues to a 'restore callback invocation state' procedure 492 that restores the callback invocation state that was saved by the 'save callback invocation state' procedure 485 and performs the requested callback service at a 'perform callback service' procedure 493. Then the callback service intercept process 480 completes through an 'end' terminal 495.

However, if the callback is to be serviced by the client program, a 'restore callback invocation state' procedure 497 restores the invocation state saved by the 'save callback invocation state' procedure 485. Then information stored by the 'setup callback tracking' procedure 471 is used to pass the callback invocation to the client program at a 'pass callback invocation' procedure 499 and the callback service intercept process 480 completes through the 'end' terminal 495.

The callback mechanism illustrated by FIG. 4C and FIG. 4D and previously described allows the callback capability to be intercepted by each interposed debug program.

Figure 5:
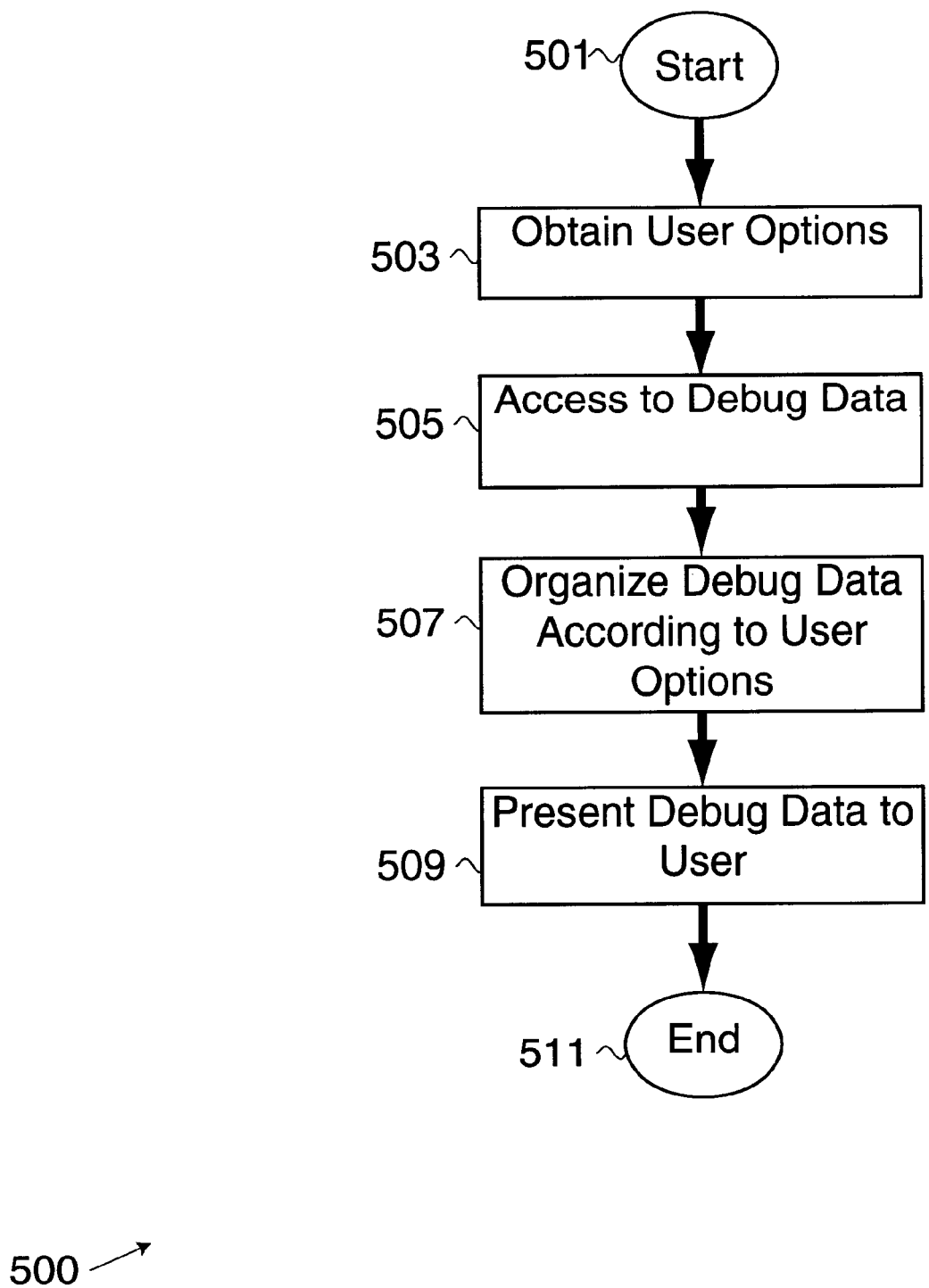
FIG. 5 illustrates debug information presentation process in accordance with a preferred embodiment.

FIG. 5 illustrates a debug information presentation process, indicated by general reference character 500, for providing service information, stored by the 'store state and information' procedure 439 and the 'capture and save result' procedure 444, to a user. This process need not be performed if the debugging information was presented on the console as the computer system booted. This process is used when information about the boot process is stored for later retrieval. The debug information presentation process 500 initiates at a 'start' terminal 501 and continues to an 'obtain user options' procedure 503. The 'obtain user options' procedure 503 obtains user options from the boot command line or from information stored in non-volatile RAM or preference file. Next, an 'access debug data' procedure 505 retrieves the data stored by the 'store state and information' procedure 439. This data is organized and processed by an 'organize debug data' procedure 507 and presented to the user at an 'present debug data' procedure 509. The debug information presentation process 500 completes through an 'end' terminal 511.

One skilled in the art will understand that the invention provides additional functionality for the bootstrap process. In particular, the invention allows a user to include additional debugging, diagnostic, and execution tracing functionality (among others) during a computer's boot process.

From the foregoing, it will be appreciated that the invention has (without limitation) the following advantages. The invention:

1) allows tracing of bootstrap services provided by a secondary bootstrap program;
2) allows a system developer to replace the standard boot service with a new service for development and testing purposes;
3) allows debugging operations to be triggered when a client program invokes a bootstrap service;

4) allows callback operations to be monitored; and 5) allows additional services to be added to a bootstrap process. These services include new filesystem services for non-native filesystem devices and network protocol stacks for specialized network access.

Although the present invention has been described in terms of a selection of presently preferred embodiments, one skilled in the art will understand that various modifications and alterations may be made without departing from the scope of the invention. Accordingly, the scope of the invention is not to be limited to the particular invention embodiments discussed herein, but should be defined only by the appended claims and equivalents thereof.

What is claimed is:

1. A computer controlled method for debugging a boot process executing on a computer, said method comprising:
   (a) executing, on said computer, a bootstrap program providing one or more services;
   (b) initiating a bootstrap debug program by said bootstrap program executing on said computer, including using a re-vector operation vector to replace an original operation vector;
   (c) intercepting, by said bootstrap debug program, a service invocation of said one or more services;
   (d) capturing service information related to said service invocation of said one or more services; and
   (e) said bootstrap debug program causing performance of said service invocation of said one or more services, wherein the bootstrap debug program is configured such that said one or more services may be selectively invoked through the bootstrap debug program.

2. The computer controlled method of claim 1 wherein said bootstrap program provides said one or more services through an original operation vector and step (b) further comprises:
   (b1) copying information from said original operation vector to a re-vector vector and using said re-vector vector as said operation vector; and
   (b2) replacing said original operation vector with a second operation vector.

3. The computer controlled method of claim 1 wherein said bootstrap program provides said one or more services through an original operation vector and step (b) further comprises:
   (b1) creating a second operation vector; and
   (b2) activating said second operation vector.

4. The computer controlled method of claim 3 wherein said second operation vector directs said service invocation to said bootstrap debug program.

5. The computer controlled method of claim 4 wherein step (e) further comprises performing said one or more services.

6. The computer controlled method of claim 5 wherein step (e) further comprises invoking said one or more services using said original operation vector.

7. The computer controlled method of claim 1 wherein said service information further comprises service invocation information at the time of said service invocation and wherein step (c) further comprises saving said service invocation information.

8. The computer controlled method of claim 7 wherein said service invocation information is selected from a group of a memory address, an invocation parameter, a data value, a time value, and a service identification.

9. The computer controlled method of claim 1 wherein said service invocation is a set-callback invocation and step (c) further comprises intercepting, by said bootstrap debug program, a callback invocation from said one or more services.

10. The computer controlled method of claim 1 wherein said service information further comprises machine state information and step (d) further comprises:
    (d1) gathering said machine state information.

11. The computer controlled method of claim 1 further comprising:
    (f) presenting said service information to a user.

12. The computer controlled method of claim 1 wherein step (b) further comprises:
    (b1) initiating, by said bootstrap debug program, execution of a client program that uses said one or more services.

13. The computer controlled method of claim 12 wherein said client program is selected from a group of a subsequent bootstrap program, an operating system program, a utility program, a debugging program, a tracing program, a filesystem extension program, a network protocol stack program, and a diagnostic program.

14. An apparatus having a central processing unit (CPU) and a memory coupled to said CPU for debugging a boot process executed by said apparatus, said apparatus comprises:
    a boot mechanism configured to execute, using said CPU and said memory, a bootstrap program providing one or more services;
    a debug initiation mechanism configured to initiate a bootstrap debug program by said bootstrap program, the debug initiation mechanism using a re-vector operation vector to replace an original operation vector;
    a service interception mechanism configured to intercept, by said bootstrap debug program, a service invocation of said one or more services;
    an information acquisition mechanism configured to capture service information related to said service invocation of said one or more service; and
    a service invocation mechanism configured to perform said service invocation of said one or more services, wherein the service invocation mechanism is initiated by the bootstrap debug program and wherein the service interception mechanism and service invocation mechanism work together to allow selective invocation of the one or more services.

15. The apparatus of claim 14 wherein said bootstrap program provides said one or more services through an original operation vector and the debug initiation mechanism further comprises:
    a vector copy mechanism configured to copy information from said original operation vector to a re-vector vector in said memory and using said re-vector vector as said operation vector; and
    a vector replacement mechanism configured to replace said original operation vector with a second operation vector.

16. The apparatus of claim 14 wherein said bootstrap program provides said one or more services through an original operation vector and the debug initiation mechanism further comprises:
    a vector creation mechanism configured to create a second operation vector in said memory; and
    a vector activation mechanism configured to activate said second operation vector.

17. The apparatus of claim 16 wherein said second operation vector directs said service invocation to said bootstrap debug program.

18. The apparatus of claim 17 wherein the service invocation mechanism further comprises a service mechanism configured to perform said one or more services.

19. The apparatus of claim 18 wherein the service invocation mechanism further comprises a service execution mechanism configured to execute said one or more services using said original operation vector.

20. The apparatus of claim 14 wherein said service information further comprises service invocation information at the time of said service invocation and wherein the service interception mechanism further comprises an information storage mechanism configured to save said service invocation information.

21. The apparatus of claim 20 wherein said service invocation information is selected from a group of a memory address, an invocation parameter, a data value, a time value, and a service identification.

22. The apparatus of claim 14 wherein said service invocation is a set-callback invocation and the service interception mechanism further comprises a callback interception mechanism configured to intercept, by said bootstrap debug program, a callback invocation from said one or more services.

23. The apparatus of claim 14 wherein said service information further comprises machine state information and the information acquisition mechanism further comprises:
    a machine state acquisition mechanism configured to gather said machine state information.

24. The apparatus of claim 14 further comprising:
    an information presentation mechanism configured to present said service information to a user.

25. The apparatus of claim 14 wherein the debug initiation mechanism further comprises:
    a client program initiation mechanism configured to initiate, by said bootstrap debug program, execution of a client program that uses said one or more services.

26. The apparatus of claim 25 wherein said client program is selected from a group of a subsequent bootstrap program, an operating system program, a utility program, a debugging program, a tracing program, a filesystem extension program, a network protocol stack program, and a diagnostic program.

27. A computer program product comprising:
    a computer usable storage medium having computer readable code embodied therein for causing a computer to debug a boot process executed by said computer, said computer readable code comprising:
        computer readable program code configured to cause said computer to effect a boot mechanism configured to execute, using said CPU and said memory, a bootstrap program providing one or more services;
        computer readable program code configured to cause said computer to effect a debug initiation mechanism configured to initiate a bootstrap debug program by said bootstrap program, the debug initiation mechanism using a re-vector operation vector to replace an original operation vector;
        computer readable program code configured to cause said computer to effect a service interception mechanism configured to intercept, by said bootstrap debug program, a service invocation of said one or more services;
        computer readable program code configured to cause said computer to effect an information acquisition mechanism configured to capture service information related to said service invocation of said one or more services; and
        computer readable program code configured to cause said computer to effect a service invocation mechanism configured to perform said service invocation of said one or more services.

28. The computer program product of claim 27 wherein said bootstrap program provides said one or more services through an original operation vector and the debug initiation mechanism further comprises:
    computer readable program code configured to cause said computer to effect a vector copy mechanism configured to copy information from said original operation vector to a re-vector vector in said memory and using said re-vector vector as said operation vector; and
    computer readable program code configured to cause said computer to effect a vector replacement mechanism configured to replace said original operation vector with a second operation vector.

29. The computer program product of claim 27 wherein said bootstrap program provides said one or more services through an original operation vector and the debug initiation mechanism further comprises:
    computer readable program code configured to cause said computer to effect a vector creation mechanism configured to create a second operation vector in said memory; and
    computer readable program code configured to cause said computer to effect a vector activation mechanism configured to activate said second operation vector.

30. The computer program product of claim 27 wherein said service information further comprises service invocation information at the time of said service invocation and wherein the service interception mechanism further comprises computer readable program code configured to cause said computer to effect an information storage mechanism configured to save said service invocation information.

31. The computer program product of claim 27 wherein said service invocation is a set-callback invocation and the service interception mechanism further comprises computer readable program code configured to cause said computer to effect a callback interception mechanism configured to intercept, by said bootstrap debug program, a callback invocation from said one or more services.

32. The computer program product of claim 27 wherein said service information further comprises machine state information and the information acquisition mechanism further comprises:
    computer readable program code configured to cause said computer to effect a machine state acquisition mechanism configured to gather said machine state information.

33. The computer program product of claim 27 further comprising:
    computer readable program code configured to cause said computer to effect an information presentation mechanism configured to present said service information to a user.

34. The computer program product of claim 27 wherein the debug initiation mechanism further comprises:
    computer readable program code configured to cause said computer to effect a client program initiation mechanism configured to initiate, by said bootstrap debug program, execution of a client program that uses said one or more services.

35. A computer program product comprising:
    a computer data signal embodied in a carrier wave having computer readable code embodied therein for causing a computer to debug a boot process executed by said computer, said computer readable code comprising:

computer readable program code configured to cause said computer to effect a boot mechanism configured to execute, using said computer, a bootstrap program providing one or more services;

computer readable program code configured to cause said computer to effect a debug initiation mechanism configured to initiate a bootstrap debug program by said bootstrap program executing on said computer, including using a re-vector operation vector to replace an original operation vector;

computer readable program code configured to cause said computer to effect a service interception mechanism configured to intercept, by said bootstrap debug program, a service invocation of said one or more services;

computer readable program code configured to cause said computer to effect an information acquisition mechanism configured to capture service information related to said service invocation of said one or more services; and computer readable program code configured to cause said computer to effect a service invocation mechanism configured to said bootstrap debug program causing performance of said service invocation of said one or more services, wherein the bootstrap debug program is configured such that said one or more services may be selectively invoked through the bootstrap debug program.

36. A computer program product as recited in claim 35, wherein the bootstrap program provides said one or more services through an original operation vector and initiating a bootstrap debug program further comprises:

copying information from said original operation vector to a re-vector vector and using the re-vector vector as said operation vector; and replacing said original operation vector with a second operation vector.

37. A computer program product as recited in claim 35, wherein the bootstrap program provides the one or more services through an original operation vector and executing the bootstrap program further comprises:

creating a second operation vector; and activating the second operation vector.

38. A computer program product as recited in claim 37, wherein the second operation vector directs the service invocation to the bootstrap debug program.

39. A computer program product as recited in claim 38, wherein performing the service invocation further comprises performing the one or more services.

40. A computer program product as recited in claim 39, wherein performing the service invocation further comprises invoking the one or more services using the original operation vector.

41. A computer program product as recited in claim 35, wherein the service information further comprises service invocation information at the time of the service invocation and wherein intercepting the service invocation comprises saving the service invocation information.

42. A computer program product as recited in claim 41, wherein the service invocation information is selected from a group consisting of a memory address, an invocation parameter, a data value, a time value, and a service identification.

43. A computer program product as recited in claim 35, wherein the service invocation is a set-callback invocation and intercepting the service invocation comprises intercepting, by said boot debug program, a callback invocation from the one or more services.

44. A computer program product as recited in claim 35 wherein the service information further comprises machine state information and capturing service information further comprises gathering machine state information.

45. A computer program product as recited in claim 35, the said computer readable code further comprising:

computer readable program code configured to cause said computer to effect a service presentation mechanism configured to present service information to a user.

46. A computer program product as recited in claim 35, wherein initiating the bootstrap debug program further comprises initiating, by the bootstrap debug program, execution of a client program that uses the one or more services.

47. A computer program product as recited in claim 36, wherein the client program is selected from a group consisting of a subsequent bootstrap program, an operating system, a utility program, a debugging program, a tracing program, a file system extension program, a network protocol stack program, and a diagnostic program.

* * * * *